Patented July 19, 1932

1,867,587

UNITED STATES PATENT OFFICE

IWAN OSTROMISLENSKY, OF NEW YORK, N. Y., ASSIGNOR TO OSTRO RESEARCH LABORATORIES, INC., OF NEW YORK, N. Y., A CORPORATION OF NEW JERSEY

PURIFIED PHENYLENE-DISAZO-BISMETA-PHENYLENEDIAMINE

No Drawing. Application filed November 11, 1929, Serial No. 406,528. Renewed December 9, 1931.

This invention relates to a new compound and its preparation.

The compound of the invention is particularly applicable to the treatment of infections or for the prevention of infections of the genito-urinary tract, but it is not limited in its use and is valuable in treating various other infections.

In order to overcome such infections with best results the preparations used should have high bacteriostatic power, i. e., prevent the growth of germs even when in high dilutions, have a minimum toxicity, and be regularly and rapidly eliminated by the system, so that they can be administered daily in quantities sufficient to produce bacteriostatic concentration at the focus of infection.

They should be capable of selective adsorption by the infected tissues and organs, and upon daily ingestion should accumulate therein. Theoretically, bactericidal power, though not necessary, is helpful providing the toxicity is not high. Practically, however, high bactericidal power has been found to be closely associated with high toxicity, to such an extent that in other highly bactericidal compounds investigated by me, it was impossible to introduce them with safety into the human body in doses sufficient to produce even bacteriostatic concentration.

An object is to provide a pure new preparation having bacteriostatic properties effective against a variety of germs combined with low toxicity.

A further object is to provide a method for making the pure preparation.

For a complete disclosure of the nature and objects of the invention, reference is made to the accompanying description and claims.

The invention comprises broadly a purified material comprising the group

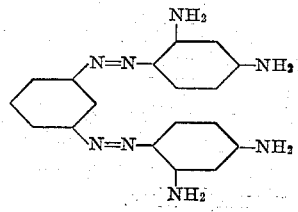

and it further comprises the process of making it.

The dye stuff known as Bismark brown, Manchester brown, etc., has been known for many years, and is a complex mixture of a number of azo dyes and some tarry products. The dye now sold on the market is used for coloring jute and cotton in connection with a mordant, and it has also been used to some extent in bacteriology for coloring germs and tissues. I have investigated the properties of Bismark brown sold under various trade marks and have found the ratio between its toxicity and bacteriostatic index to be so low as to render it valueless for therapeutical purposes. Even in 1% aqueous solution it develops fungi. Among substances isolated from Bismark brown and investigated by me are:—triamino azobenzol having amino groups in both nuclei, which was highly toxic and had a very low bacteriostatic index; nitroso phenylenediamine, which was still more toxic and had a bacteriostatic index of zero; and tarry substances of no therapeutical value.

Although entering into Bismark brown, Manchester brown, vesuvine and other dyestuffs as their chief component, benzene-disazo-bismeta-phenylene-diamine dihydrochloride has not previously been obtained in chemically pure condition. I succeeded in working out a method of obtaining and separating off this substance in chemically pure condition.

In this connection it is sufficient to remark that the preparation obtained by me melts in the form of the free base betwen 183 and 184° C. and that it is almost insoluble in boiling benzol, whereas the benzene-disazo-bismeta-phenylene diamine described in the literature is readily recrystallized from boiling benzol and melts at 118° C. (See Color Index, page 81, No. 331.) I tried to extract 20 gms. of my preparation (M. P. 183 to 184° C.) in a Soxhlete with hot benzol (500 gms.) over a period of six days, but ultimately obtained not more than 2 gms. of the free base which precipitated out of the benzol with a M. P. of approximately 179° C. The nitrogen content of the latter substance was 30.56%, which corresponds almost exactly with that of tri-amino-azo-benzene.

The new substance benzene-meta-disazo-bis-meta-phenylenediamine, in C. P. condition having a melting point of 183°–185° C. and the formula

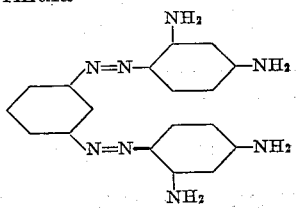

was found to be of great therapeutical value. The purified substance obtained by me is but slightly toxic and has a bacteriostatic index of 1:25000. Rabbits endure it subcutaneously in a dose of 0.3 gms. per kilogram of body weight. White mice tolerate 1 c. c. in a dilution of 1:50 to every kilogram, or 1 gm. to every kilogram of body weight. It is eliminated from the system with the urine in the course of 6 to 12 hours, so that animals may be given certain doses several times without causing any concomitant reaction. It may be administered in the human body in doses of 0.2 to 0.4 gms. This dosage may be repeated two or three times daily to make up a daily dosage of 0.6 grams and such treatment may be continued systematically for a period of several weeks without any concomitant reactions. The material is eliminated from the system with the urine in the course of 6 to 18 hours. It colors the urine very slightly and sometimes the latter retains its normal color. Apparently, the material is eliminated in the form of a leuco-base of some dye, as urine containing the leuco-base takes on a dark or even a black color very slowly if an acid, such as hydrochloric, be added to it, and it occurs much quicker if a current of air is passed at the same time through the urine.

A preferred method of obtaining the purified product is as follows:

25 litres distilled water and 4440 c. c. of 37% hydrochloric acid are poured over 3200 gms. of meta-phenylenediamine. The resulting mixture is stirred until it forms a solution which, if necessary, may be filtered off. Then 30 kilograms of ice are added to it. Into this mixture a solution of 1560 gms. sodium nitrite in 6 litres of water is added in two portions in the course of some 2 to 5 minutes. This mixture foams and then begins giving off gaseous nitrogen in the form of large bubbles. At the beginning the gas comes fast but gradually slows down and in 20 to 30 minutes it practically stops. While the nitrogen is evolved, another kilogram of ice is added to the mixture. Then it is left to stand overnight. Next morning enough sodium chloride is added to make a concentration of 8 to 15%, and the whole stirred vigorously. The mixture is left to stand at room temperature until next morning, when the precipitate which is formed in the solution is filtered off and is thoroughly pressed. The resulting sediment is transferred to a large earthenware jar and, with vigorous stirring, 10 litre of water are poured in. Once more salt is added to a lesser amount than before. This mixture is allowed to stand overnight. Next morning the product is again sucked off and washed in a Buechner funnel with 2 litres of distilled water. The resulting product weighing about 4 kilograms is then dried in a large porcelain dish over a boiling water bath to constant weight. The yield of the end product, i. e. the dihydrochloride of benzene-meta-disazo-bis-meta-phenylenediamine is about 1800 gms. When dissolved in water and precipitated with ammonia this product gives off the corresponding free base which, after it is washed with water, is pressed and dried to constant weight over a boiling water bath; it appears to fuse in a capillary between 170 and 180° C. and melts completely at 183° to 185° C. The base is a brick-red powder. The above mentioned process gives a yield of 56 to 57% on the weight of the original meta-phenylenediamine.

This yield may be considerably augmented if the first mother liquor remaining after the salting-out process be subjected to the following treatment: (1) the bases which are present are precipitated by means of crystalline sodium carbonate in free condition; (2) then the sediment, after it has been centrifuged and sucked off is thoroughly washed with water until the mineral salts present are entirely removed; (3) the resulting sediment is again dissolved in a relatively small excess of hydrochloric acid (dark stain on Congo paper); and (4) the benzene-meta-disazo-bis-meta-phenylenediamine is then precipitated by means of fractional salting-out from this weak hydrochloric acid solution, as has been described in the given example.

It is pointed out that the meta-phenylenediamine on the market generally contains a greater or less amount of the isomer para-phenylenediamine, and hence if such starting material be used the finished product will contain isomers. Therefore tests were carried out by diazotizing a mixture of 1 mol. meta-phenylenediamine and 2 mol. para-phenylenediamine, and a mixture of 1 mol. of the para and 2 mol. of meta product was also diazotized. The chemically pure products isolated from the reaction products were tested for bacteriostatic index, and the latter was found to be negligible as compared with the index of the purified benzene-meta-diazo-bis-meta-phenylenediamine. Therefore in preparing the product by my above described process care should be taken to use a pure meta-phenylenediamine.

Having thus described my invention what I claim and desire to protect by Letters Patent is:

1. As a new material, a purified phenylene-disazo-bismeta-phenylene diamine having the formula

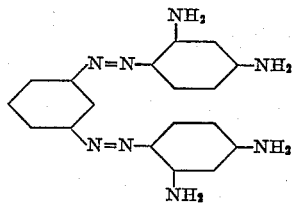

and having the form of a brick red powder and a melting point of approximately 183°–185° C.

2. As a new material, a purified phenylene-disazo-bismeta-phenylene diamine having the formula

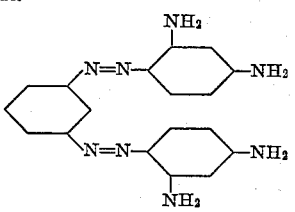

and having the form of a brick red powder and being substantially insoluble in boiling benzol.

3. As a new material, a purified phenylene-disazo-bismeta-phenylene diamine having the formula

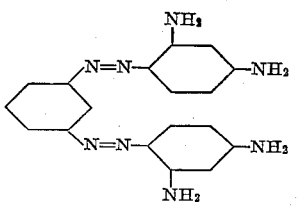

having the form of a brick red powder, a melting point of approximately 183–185° C., and substantially insoluble in boiling benzol.

4. The process of making chemically pure benzene-meta-disazo-bis-meta-phenylenediamine dihydrochloride which comprises reacting on meta-phenylene diamine dihydrochloride with sodium nitrite in slightly acid solution, fractionally salting out benzene-meta-disazo-bis-meta-phenylenediamine dihydrochloride from the solution by a mineral salt, washing the precipitate, and drying to constant weight.

5. The process of making chemically pure benzene-meta-disazo-bis-meta-phenylenediamine dihydrochloride which comprises reacting on meta-phenylenediamine dihydrochloride with sodium nitrite in slightly acid solution, cooling during the reaction, standing, heating, adding sodium chloride to make a concentration of 8–15%, cooling, filtering off the precipitate, repeating the salting out steps on said precipitate, washing, and drying.

Signed at New York county and State of New York, this 4th day of November, 1929.

IWAN OSTROMISLENSKY.